July 7, 1953     H. B. COWGILL, JR     2,644,653
AIRPLANE WITH AUXILIARY LIFTING ROTOR
Filed July 16, 1949     3 Sheets-Sheet 1
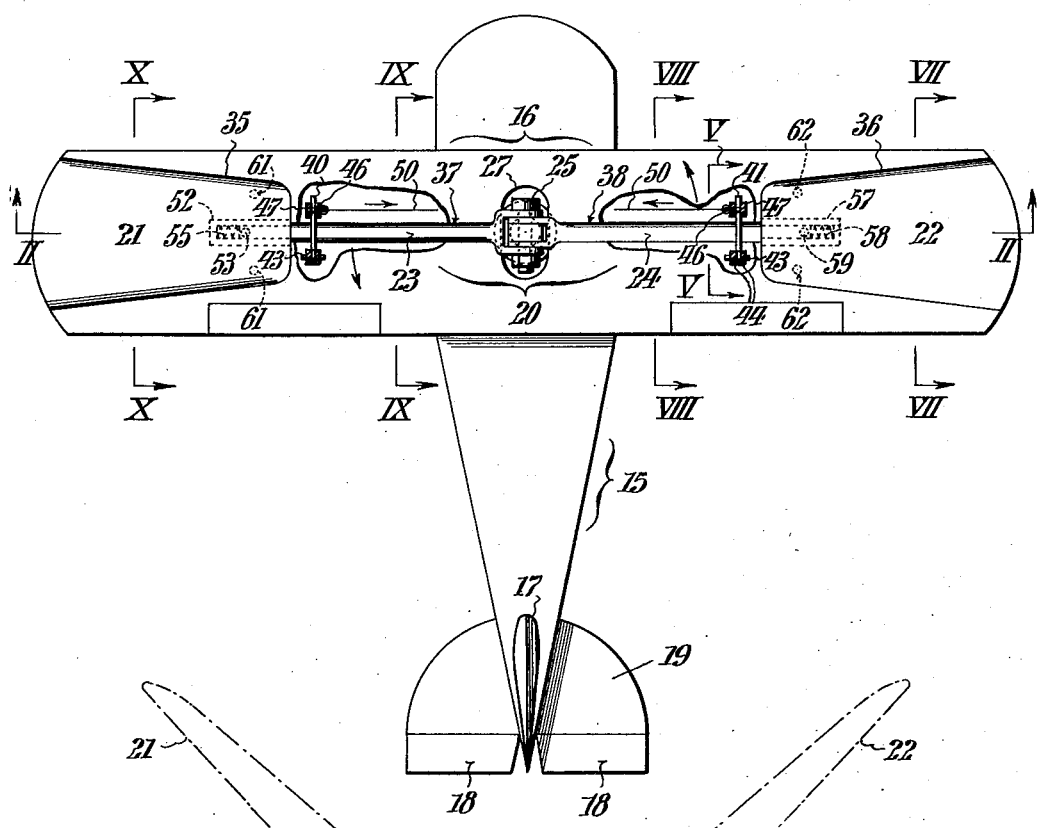
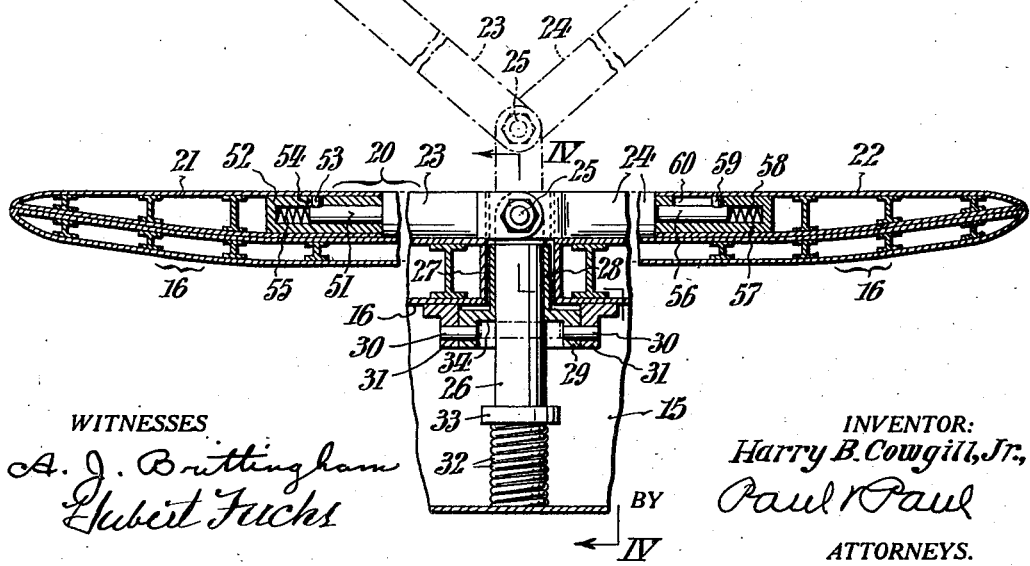
WITNESSES
INVENTOR:
Harry B. Cowgill, Jr.,
BY
ATTORNEYS.

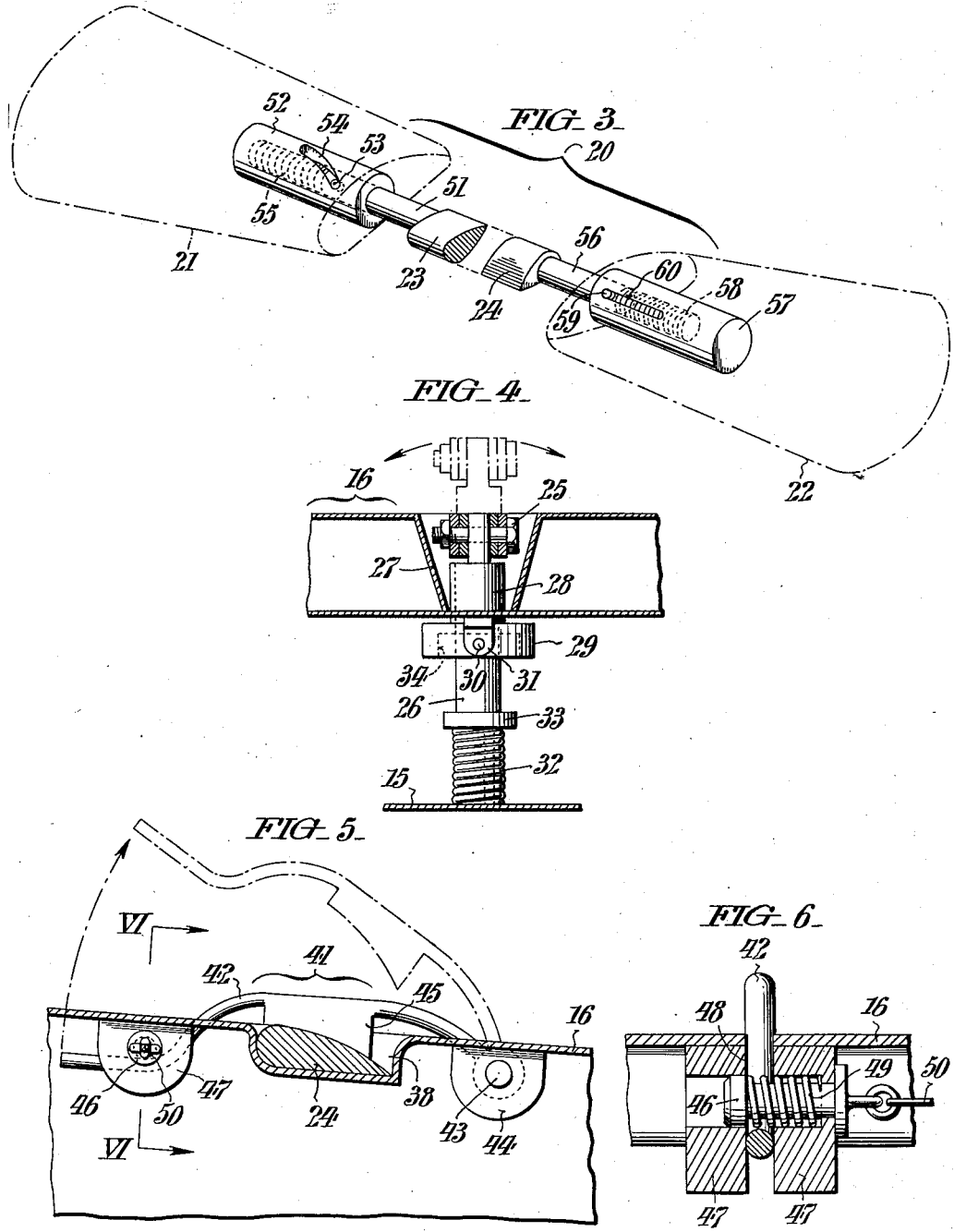

July 7, 1953   H. B. COWGILL, JR   2,644,653
AIRPLANE WITH AUXILIARY LIFTING ROTOR
Filed July 16, 1949   3 Sheets-Sheet 3

WITNESSES
A. J. Brittingham
Hubert Fuchs

INVENTOR:
Harry B. Cowgill, Jr.,
BY Paul & Paul
ATTORNEYS.

Patented July 7, 1953

2,644,653

UNITED STATES PATENT OFFICE 2,644,653

AIRPLANE WITH AUXILIARY LIFTING ROTOR

Harry B. Cowgill, Jr., Raeford, N. C.

Application July 16, 1949, Serial No. 105,148

8 Claims. (Cl. 244—8)

This invention relates to aircraft. More particularly, it is concerned with aircraft of the heavier than air type, i. e. powered planes and tow planes or gliders. Aircraft of the kind especially referred to, as ordinarily constructed, require the use of special fields or ports of large area for safe landing. Accordingly, forced landings of such craft in fields or places of restricted area made necessary in emergencies by reason of fog, poor visibility or other causes, are invariably attended by loss of life or destruction of cargo, as well as by serious damage to or complete wreckage of the craft. While autogyros and helicopters are designed with a view toward overcoming landing difficulties in restricted areas, they lack the flying speed of the first mentioned types of aircraft.

The chief aim of my invention is to provide an aircraft in which the advantageous features of the two general types above discussed are combined, that is to say, one which has the speed of the common type of fixed wing planes and which, notwithstanding, can be landed like autogyros or helicopters within relatively small spaces if desired, or as may be necessary in emergencies. This objective is attained in practice, as hereinafter more fully disclosed, through provision of a bi-vaned rotor which is mounted for capacity to revolve about a vertical axis substantially at the central point of the main wing of the plane, said rotor, with all its parts, being normally nested within the confines of the main wing during the flight of the craft. Through further provision of securing means arranged for actuation at will, the rotor can be released for operation at any time during flight of the craft. The speed of the rotor will accelerate as the craft begins to drop vertically and so retard the descent to make safe and smooth landing possible within a relatively small space. In the case of powered planes, the rotor may be coupled to the engine and positively driven in the proper direction to increase the rate of retardation; while in the case of gliders, the rotor will be rotated solely by aerodynamic action after the manner of the revolving wing of an autogyro.

Other objects and attendant advantages will appear from the following detailed description of the attached drawings, wherein Fig. 1 shows, in top plan, a non-powered monoplane or glider conveniently embodying my invention, with portions of its main wing broken out to expose certain important features which otherwise would be concealed.

Fig. 2 is a broken out transverse section of the structure, taken as indicated by the angled arrows II—II in Fig. 1, and drawn to a larger scale.

Fig. 3 is a broken out perspective view of the rotor of my improved aircraft.

Figs. 4 and 5 are fragmentary sectional views taken as indicated respectively by the angled arrows IV—IV, V—V in Figs. 1 and 2.

Fig. 6 is a detail section taken as indicated by the angled arrows VI—VI in Fig. 5.

Figure 7:
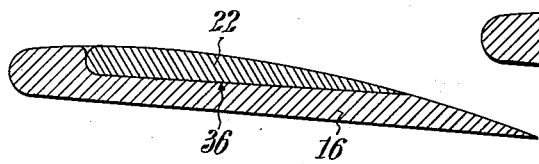
Figure 11:
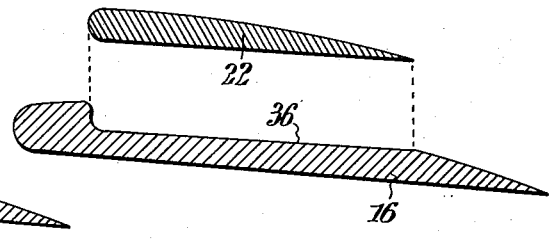

Figs. 7, 8, 9, and 10 are diagrammatic views in transverse sections of the main wing of the craft, taken as respectively indicated by the angled arrows VII—VII, VIII—VIII, IX—IX and X—X in Fig. 1, and showing how the parts of the rotor are normally nested within the confines of said wing; and Figs. 11–14 are views corresponding respectively to Figs. 7–10 showing the positions of the rotor parts relative to the main wing when said rotor is released for operation.

With more detailed reference, first more especially to Figs. 1 and 2 of these illustrations, the fuselage and the main or sustaining wing of the glider there shown for the purpose of exemplifying my invention, are respectively designated 15 and 16. The direction of flight of the craft is intended to be controlled in the usual well known way by means of a rudder 17 and elevators 18 which latter are attached to the rear edge of a stabilizer 19 at the tail end of the fuselage 15.

In accordance with my invention the craft is provided with a rotor 20 having suitably cambered vanes 21, 22 at the outer ends of a pair of radially arranged arms 23, 24 which are likewise suitably cambered, and whereof the inner ends are hinged to angle about a transverse bolt 25 at the top of a vertical axis shaft 26 substantially at the mid point of the main wing 16, i. e., slightly forward of the center of lift. As shown in Figs. 2 and 4, the shaft 26 extends down through a clearance opening 27 in the wing 16 and into the fuselage 15, it being supported with capacity for rotation and endwise shifting, in a sleeve bearing 28 having a head 29 at the bottom end thereof. Trunnions 30 extending radially from the head 29 of the sleeve 28 and engaged in bearings 31 affixed to the main wing 16 centrally of its bottom, permit a certain amount of rocking of the rotor axis in fore and aft direction. Upon release of the rotor 20 as later on explained, the shaft 26 is thrust upward by a helical compression spring 32, the limit of the axial shift being determined by engagement of a circumferential enlargement 33 at the lower end of said shaft within the hollow 34 of the head 29 at the bottom of the bearing sleeve 28.

Figure 8:
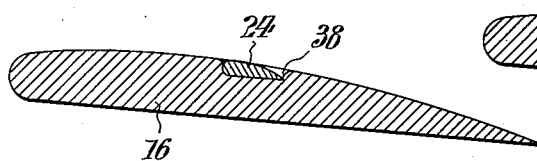
Figure 12:
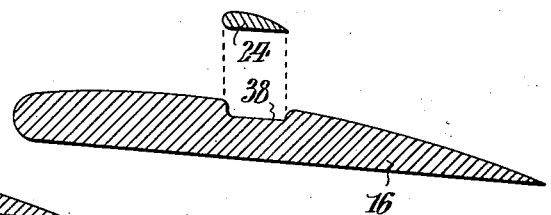
Figure 9:
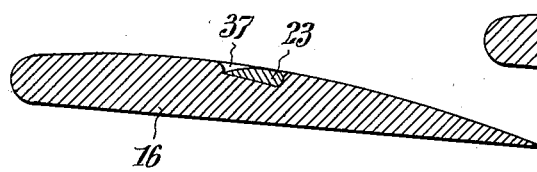
Figure 13:
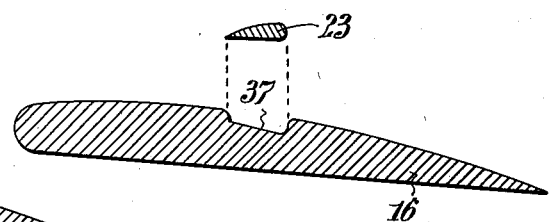
Figure 10:
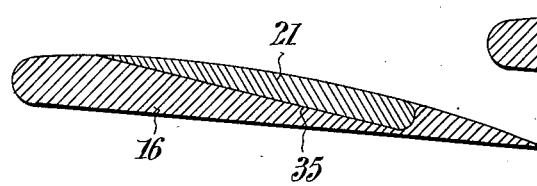
Figure 14:
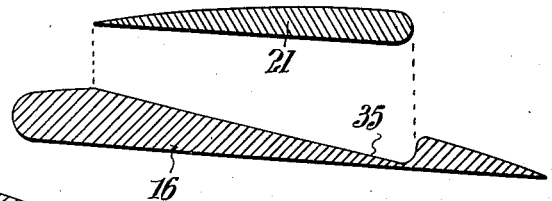

The vanes 21 and 22 of the rotor 20 are normally nested in conformative recesses 35, 36 in the wing 16 at the outer ends of the latter, fitting snugly into said recesses as shown in Figs. 1, 7 and 10 with their top surfaces flush with the top surface of said wing. The vane arms 23 and 24 likewise fit snug within conformative longitudinal grooves 37, 38 which respectively extend between the recesses 35, 36 and the central clearance opening 27 in the wing as shown in Figs. 1, 9 and 8. All the parts of the rotor 20 are thus normally located within the confines of the wing 16 where they cannot interfere in any way with the normal flight of the craft, being locked against the possibility of accidental displacement by securing devices indicated at 40 and 41 in Figs. 1 and 5. These securing devices 40 and 41 are identical in construction, and respectively comprise hasps 42 which engage crosswise over the rotor arms 23, 24 immediately adjacent the inner ends of the vanes 21, 22. The hasps 42 of the respective securing devices are pivoted, as instanced in Fig. 5, on pins 43 engaged crosswise in spaced lugs 44 within the hollow of the main wing 16, and which, midway of their lengths, are formed with downward projections 45 to bear upon the rotor arms 23 and 24. The swinging ends of the hasps 42 are normally engaged beneath latch bolts 46 which are constrained to axial shifting in guide lugs 47 within the hollow of the main wing at opposite edges of entrant slots 48 in the top surface of said wing as instanced in Fig. 6. The bolts 46 are normally maintained in projected latching position by springs 49, and to them are connected pull cords or cables 50 which may extend to a point convenient for operation within the fuselage 15 of the craft or to the fuselage of the towing plane if the craft be a glider.

It will be noted, from Fig. 3, that the vanes 21 and 22 are so arranged as to predetermine counterclockwise autogyration upon release of the rotor 20 as later on explained, and, from Fig. 7, that the cross sectional configuration of the main wing 16 allows nesting of the right hand vane 22 of the rotor at the desired or required angle of pitch or incidence. The latter is however not true with regard to the nesting of the left hand vane 21. Accordingly, the outer end of the arm 23 is made cylindric as at 51, and the vane 21 provided with an insert bushing 52 which is rotatably and axially shiftable on the arm end 51 within the limits imposed by cooperation of a radial stud 53 on said arm with a cam slot 54 in said bushing. Upon release of the rotor 20, a spring 55 instantly acts upon the vane 21 to shift it outward of the arm 23, when, through incidental camming action between the slot 54 with the stud 53, said vane is turned to a pitch angle corresponding to that of the vane 22. In order to prevent unbalancing of the rotor when the vane 21 is outwardly shifted in the manner just described, the outer end of arm 24 is similarly made cylindric as at 56 and the vane 22 provided with an inset bushing 57 to fit thereover. Here, likewise, a spring 58 is relied upon to urge the vane 22 outward, and a radial stud 59 provided on the arm to cooperate with a slot 60 in the sleeve 57, the latter slot being substantially straight however, so that no turning movement or only slight movement is induced in said vane. When normally nested in the main wing 16 of the craft as in Fig. 1, the vanes 21 and 22 are held against being thrust outward under the influence of the springs 55 and 58 as a consequence of the registry of holes in said vanes with dowel pins 61 and 62 upstanding from the top surfaces of the depressions 35 and 36 in said wing.

Operation

Under normal conditions, the craft is flown as ordinarily and landed in the usual way without the use of the rotor 20. In the case of emergencies or when it is desired to land in small areas other than regular airports, the craft is first brought to near a stall to reduce its forward speed, whereupon the cords or cables 50 are pulled to withdraw the latch bolts 46 for release of the hasps 42 of the securing devices 40 and 41. The shaft 26 of the rotor 20 is thereupon instantly thrust upward by the spring 32, and the vanes 21, 22 are at the same time freed to first assume the angular positions in which they are shown in broken lines in Fig. 2 by sweep of the air beneath them, and to be shifted outward of the arms 23, 24 by the springs 55, 58. As the craft begins to drop, the rotor 20 will be rotated by aerodynamic action and the vanes gradually assume a more nearly horizontal position as the rotation accelerates. In this way, the drop of the craft is effectively retarded so that the landing is made gently and safely in the way characteristic of an autogyro.

My invention is thus particularly advantageous in connection with pilotless gliders which, for example, could be economically employed in transporting freight, since, upon being detached from the towing planes with the rotors released, they can be landed with fairly reliable accuracy in predesignated small fields. Moreover, gliders constructed in accordance with my invention, can be advantageously used in conjunction with a pick up apparatus such as disclosed in my Patents Nos. 2,433,893 and 2,467,112 for entrainment with a powered towing plane from a small field as distinguished from a regular airport. As an illustrative practical use of such a system, farmers could load their produce into the gliders right in the field, in readiness to be picked up by a towing plane for transfer by air and subsequent discharge at any desired destination.

It is to be understood that many of the parts have been purposely exaggerated and disproportioned in the drawings for clarification of their construction and operation.

Having thus described my invention, I claim:

1. An aircraft of the character described having a rigid main wing extending transversely of its fuselage; a bi-vaned rotor with its shaft vertically arranged substantially at the mid point of the main wing; releasable securing means mounted on said wing and engageable with said rotor for normally holding the rotor fixed with its vanes in parallel relation to the main wing whereby the securing means can be actuated during flight of the craft to release the rotor for operation; and a bearing for the rotor shaft pivotally supported so as to be capable of limited movement fore and aft of the craft upon release of the rotor.

2. An aircraft of the character described having a rigid main wing extending transversely of its fuselage; a bi-vaned rotor having its shaft vertically arranged substantially at the mid point of the main wing, said rotor being normally contained within the main wing with capacity for being shifted beyond the plane of the latter; releasable securing means mounted on said wing and engageable with said rotor whereby the rotor is normally held stationary within the confines of the main wing, said means being operable at will during flight of the craft to release the rotor for operation beyond the plane of the main wing; and a bearing for the rotor shaft pivotally supported so as to be capable of limited movement fore and aft of the craft upon release of the rotor.

3. An aircraft according to claim 1, wherein the top surface of the main wing is depressed for flush nesting of the rotor; and wherein the rotor is upwardly displaceable for operation beyond the plane of the main wing upon being released; and wherein the securing means comprises hasps which are pivoted on the main wing to overlie the rotor vanes, and retractable latches normally engaged over the swinging ends of the hasps.

4. An aircraft according to claim 1, wherein the vanes of the rotor are mounted on arms extending diametrically from a central axis hub; and wherein the main wing is provided in one of its surfaces adjacent its opposite ends with conformative depressions for flush nesting of the rotor vanes, and with a longitudinally-extending groove for flush nesting of the rotor wing arms.

5. An aircraft according to claim 1, wherein the vanes of the rotor are mounted on arms extending diametrically from a central axis hub; and further including means for automatically shifting the vanes of the rotor outward of their supporting arms to equal extents upon release of the rotor.

6. An aircraft according to claim 1, wherein the vanes of the rotor are mounted on arms extending diametrically from a central axis hub, wherein one rotor vane is fixed at the proper angle of incidence, against rotation upon its supporting arm; and wherein means are provided for automatically shifting the other rotor vane rotatively about the axis of its supporting arm upon release of the rotor for correspondence to the angular pitch of the first mentioned vane.

7. An aircraft according to claim 1, wherein the vanes of the rotor are mounted on arms extending diametrically from a central axis hub; and further including spring means for automatically shifting one of the rotor vanes to a definite extent longitudinally of its supporting arm at a fixed angular pitch upon release of the rotor; and spring means concurrently operative automatically to shift the other vane longitudinally of its supporting arm to a like extent and at the same time shifting it rotatively for correspondence to the angular pitch of the first mentioned vane.

8. An aircraft according to claim 1, wherein the vanes of the rotor are mounted on arms extending diametrically from a central axis hub; and further including spring means for automatically shifting one of the rotor vanes to a definite extent longitudinally of its supporting arm at a fixed angular pitch upon release of the rotor; and means for holding the rotor vanes retracted against the force of said spring means while normally nested within the main wing of the craft.

HARRY B. COWGILL, Jr.

References Cited in the file of this patent

UNITED STATES PATENTS

| Number | Name | Date |
|---|---|---|
| 1,719,048 | Ehmig | July 2, 1929 |
| 1,777,528 | Myers | Oct. 7, 1930 |
| 1,855,084 | Alvistur | Apr. 19, 1932 |
| 1,875,210 | Bang | Aug. 30, 1932 |
| 1,904,923 | MacCaskie | Apr. 18, 1933 |
| 2,464,285 | Andrews | Mar. 15, 1949 |
| 2,465,703 | Allen | Mar. 29, 1949 |